United States Patent
Sevinsky et al.

(10) Patent No.: US 9,004,162 B2
(45) Date of Patent: Apr. 14, 2015

(54) METHODS OF STIMULATING ACETOCLASTIC METHANOGENESIS IN SUBTERRANEAN DEPOSITS OF CARBONACEOUS MATERIAL

(75) Inventors: Joel R. Sevinsky, Highlands Ranch, CO (US); Gary F. Vanzin, Arvada, CO (US); Shelly A. Haveman, Lakewood, CO (US); Nicholas R. Kotter, Golden, CO (US); William Mahaffey, Evergreen, CO (US)

(73) Assignee: Transworld Technologies Inc., Houston, TX (US)

( * ) Notice: Subject to any disclaimer, the term of this patent is extended or adjusted under 35 U.S.C. 154(b) by 379 days.

(21) Appl. No.: 13/429,051

(22) Filed: Mar. 23, 2012

(65) Prior Publication Data

US 2013/0248170 A1 Sep. 26, 2013

(51) Int. Cl.
| | |
|---|---|
| *E21B 43/22* | (2006.01) |
| *E21B 47/00* | (2012.01) |
| *C10G 32/00* | (2006.01) |
| *C09K 8/582* | (2006.01) |
| *C09K 8/00* | (2006.01) |

(52) U.S. Cl.
CPC . *E21B 47/00* (2013.01); *C09K 8/00* (2013.01); *C09K 8/582* (2013.01)

(58) Field of Classification Search
USPC .............. 166/246, 250.01, 305.1; 435/281; 507/201
See application file for complete search history.

(56) References Cited

U.S. PATENT DOCUMENTS

| | | |
|---|---|---|
| 1,990,523 A | 2/1935 | Buswell et al. |
| 2,413,278 A | 12/1946 | Zobell |
| 2,641,566 A | 6/1953 | Zobell |
| 2,659,659 A | 11/1953 | Schmidl |
| 2,660,550 A | 11/1953 | Updegraff et al. |
| 2,807,570 A | 9/1957 | Updegraff |
| 2,907,389 A | 10/1959 | Hitzman |
| 2,975,835 A | 3/1961 | Bond |
| 3,006,755 A | 10/1961 | Adams |
| 3,185,216 A | 5/1965 | Hitzman |
| 3,332,487 A | 7/1967 | Jones |

(Continued)

FOREIGN PATENT DOCUMENTS

| | | |
|---|---|---|
| DE | 4036787 A1 | 5/1992 |
| DE | 4115435 C1 | 8/1992 |

(Continued)

OTHER PUBLICATIONS

Aitken, C., et al., "Anaerobic hydrocarbon degradation in deep subsurface oil reserves" Nature, Sep. 16, 2004, pp. 291-294.

(Continued)

*Primary Examiner* — Catherine Loikith
(74) *Attorney, Agent, or Firm* — Kilpatrick Townsend & Stockton LLP

(57) ABSTRACT

Methods for enhancing acetoclastic methanogenesis in subterranean geologic formations. The methods may include accessing a microorganism consortium in the formation, and assessing the consortium for acetoclastic methanogenic activity. The methods may further include modifying the formation environment based on the consortium assessment to increase methane production from acetoclastic methanogenic pathways used by the consortium. The modifications to the formation environment may include introducing an amendment and/or introducing acetoclastic microorganisms to the formation environment.

14 Claims, 8 Drawing Sheets

(56) References Cited

U.S. PATENT DOCUMENTS

| | | | |
|---|---|---|---|
| 3,340,930 A | 9/1967 | Hitzman |
| 3,437,654 A | 4/1969 | Dix |
| 3,637,686 A | 1/1972 | Kokubo et al. |
| 3,640,846 A | 2/1972 | Johnson |
| 3,724,542 A | 4/1973 | Hamilton |
| 3,800,872 A | 4/1974 | Friedman |
| 3,826,308 A | 7/1974 | Compere-Whitney |
| 3,982,995 A | 9/1976 | Yen et al. |
| 4,184,547 A | 1/1980 | Klass et al. |
| 4,300,632 A | 11/1981 | Wilberger et al. |
| 4,316,961 A | 2/1982 | Klass et al. |
| 4,329,428 A | 5/1982 | Ghosh et al. |
| 4,349,633 A | 9/1982 | Worne et al. |
| 4,358,535 A | 11/1982 | Falkow et al. |
| 4,358,537 A | 11/1982 | Chynoweth |
| 4,386,159 A | 5/1983 | Kanai |
| RE31,347 E | 8/1983 | Reijonen et al. |
| 4,416,332 A | 11/1983 | Wiberger et al. |
| 4,424,064 A | 1/1984 | Klass et al. |
| 4,446,919 A | 5/1984 | Hitzman |
| 4,450,908 A | 5/1984 | Hitzman |
| 4,475,590 A | 10/1984 | Brown |
| 4,481,293 A | 11/1984 | Thomsen et al. |
| 4,522,261 A | 6/1985 | McInerney et al. |
| 4,562,156 A | 12/1985 | Isbister et al. |
| 4,579,562 A | 4/1986 | Tarman et al. |
| 4,610,302 A | 9/1986 | Clark |
| 4,640,767 A | 2/1987 | Zajic et al. |
| 4,648,458 A | 3/1987 | Broadus |
| 4,666,605 A | 5/1987 | Minami et al. |
| 4,678,033 A | 7/1987 | Killough |
| 4,799,545 A | 1/1989 | Silver et al. |
| 4,826,769 A | 5/1989 | Menger |
| 4,845,034 A | 7/1989 | Menger et al. |
| 4,883,753 A | 11/1989 | Belaich et al. |
| 4,905,761 A | 3/1990 | Bryant |
| 4,906,575 A | 3/1990 | Silver et al. |
| 4,914,024 A | 4/1990 | Strandberg et al. |
| 4,947,932 A | 8/1990 | Silver et al. |
| 4,971,151 A | 11/1990 | Sheehy |
| 5,044,435 A | 9/1991 | Sperl et al. |
| 5,076,927 A | 12/1991 | Hunter |
| 5,083,610 A | 1/1992 | Sheehy |
| 5,083,611 A | 1/1992 | Clark et al. |
| 5,087,558 A | 2/1992 | Webster, Jr. |
| 5,100,553 A | 3/1992 | Nomura et al. |
| 5,163,510 A | 11/1992 | Sunde |
| 5,297,625 A | 3/1994 | Premuzic et al. |
| 5,327,967 A | 7/1994 | Jenneman et al. |
| 5,340,376 A | 8/1994 | Cunningham |
| 5,341,875 A | 8/1994 | Jenneman et al. |
| 5,350,684 A | 9/1994 | Nakatsugawa et al. |
| 5,360,064 A | 11/1994 | Jenneman et al. |
| 5,363,913 A | 11/1994 | Jenneman et al. |
| 5,368,099 A | 11/1994 | Davey et al. |
| 5,424,195 A | 6/1995 | Volkwein |
| 5,490,634 A | 2/1996 | Jain et al. |
| 5,492,828 A | 2/1996 | Premuzic et al. |
| 5,500,123 A | 3/1996 | Srivastava |
| 5,510,033 A | 4/1996 | Ensley et al. |
| 5,516,971 A | 5/1996 | Hurley |
| 5,538,530 A | 7/1996 | Heaton et al. |
| 5,551,515 A | 9/1996 | Fodge et al. |
| 5,560,737 A | 10/1996 | Schuring et al. |
| 5,593,886 A | 1/1997 | Gaddy |
| 5,597,730 A | 1/1997 | Aust et al. |
| 5,601,700 A | 2/1997 | Bridge et al. |
| 5,630,942 A | 5/1997 | Steiner |
| 5,670,345 A | 9/1997 | Srivastava et al. |
| 5,695,641 A | 12/1997 | Cosulich et al. |
| 5,723,597 A | 3/1998 | Kohne |
| 5,763,736 A | 6/1998 | Daume |
| 5,854,032 A | 12/1998 | Srivastava et al. |
| 5,858,766 A | 1/1999 | Premuzic et al. |
| 5,885,825 A | 3/1999 | Lin et al. |
| 5,919,696 A | 7/1999 | Ikeda et al. |
| 5,928,864 A | 7/1999 | Kohne |
| 5,955,261 A | 9/1999 | Kohne |
| 5,955,262 A | 9/1999 | Kourilsky et al. |
| 6,090,593 A | 7/2000 | Fleming et al. |
| 6,143,534 A | 11/2000 | Menger et al. |
| 6,202,051 B1 | 3/2001 | Woolston |
| 6,210,955 B1 | 4/2001 | Hayes |
| 6,265,205 B1 | 7/2001 | Hitchens et al. |
| 6,543,535 B2 | 4/2003 | Converse et al. |
| 6,758,270 B1 | 7/2004 | Sunde et al. |
| 6,795,922 B2 | 9/2004 | Johnson et al. |
| 6,859,880 B2 | 2/2005 | Johnson et al. |
| 7,640,978 B2 | 1/2010 | Pfeiffer et al. |
| 7,696,132 B2 | 4/2010 | Pfeiffer et al. |
| 7,845,403 B2 | 12/2010 | Pfeiffer et al. |
| 7,975,762 B2 | 7/2011 | Pfeiffer et al. |
| 8,051,908 B2 | 11/2011 | Pfeiffer et al. |
| 8,448,702 B2 * | 5/2013 | Toledo et al. ............... 166/246 |
| 2002/0102673 A1 | 8/2002 | Zhang et al. |
| 2003/0062270 A1 | 4/2003 | McAlister |
| 2003/0205458 A1 | 11/2003 | Roychowdhury |
| 2003/0209340 A1 | 11/2003 | McClung |
| 2003/0216353 A1 | 11/2003 | Mosher et al. |
| 2004/0033557 A1 | 2/2004 | Scott et al. |
| 2004/0035785 A1 | 2/2004 | Rebholz |
| 2004/0164971 A1 | 8/2004 | Hayward et al. |
| 2005/0053955 A1 | 3/2005 | Sowlay et al. |
| 2005/0205260 A1 | 9/2005 | McClung, III |
| 2006/0223153 A1 | 10/2006 | Pfeiffer |
| 2006/0254765 A1 | 11/2006 | Pfeiffer et al. |
| 2007/0092930 A1 | 4/2007 | Lal et al. |
| 2007/0251146 A1 * | 11/2007 | Larter et al. ............... 48/127.5 |
| 2007/0261843 A1 * | 11/2007 | Pfeiffer et al. ............... 166/246 |
| 2007/0295505 A1 * | 12/2007 | Pfeiffer et al. ............... 166/263 |
| 2008/0289816 A1 | 11/2008 | Pfeiffer et al. |
| 2008/0299635 A1 | 12/2008 | Pfeiffer et al. |
| 2010/0035309 A1 | 2/2010 | Havemen et al. |
| 2010/0047793 A1 * | 2/2010 | Toledo et al. ............... 435/6 |
| 2010/0101782 A1 | 4/2010 | Pfeiffer et al. |
| 2010/0190203 A1 * | 7/2010 | Pfeiffer et al. ............... 435/29 |
| 2010/0300680 A1 | 12/2010 | Pfeiffer et al. |
| 2011/0139439 A1 | 6/2011 | Dannar et al. |
| 2011/0244541 A1 * | 10/2011 | Zitomer ............... 435/167 |
| 2011/0250582 A1 * | 10/2011 | Gates et al. ............... 435/3 |
| 2011/0284215 A1 | 11/2011 | Pfeiffer et al. |

FOREIGN PATENT DOCUMENTS

| | | |
|---|---|---|
| DE | 19520548 A1 | 12/1996 |
| JP | 09 121868 | 5/1997 |
| WO | 79/00201 A1 | 4/1979 |
| WO | 89/10463 A1 | 11/1989 |
| WO | 92/13172 A1 | 8/1992 |
| WO | 01/68904 A1 | 9/2001 |
| WO | 02/34931 A2 | 5/2002 |
| WO | 2005/115649 A1 | 12/2005 |
| WO | 2006/118570 A1 | 11/2006 |

OTHER PUBLICATIONS

Anderson, R., et al., "Hexadecane Decay by Methanogenesis", Nature, v. 404, p. 722, Apr. 13, 2000.

Anderson, R., et al., "Anaerobic Benzene Oxidation in the Fe(III) Reduction Zone of Petroleum-Contaminated Aquifers", Environmental Science & Technology, v. 32, pp. 1222-1229, 1998.

Artech Inc., Biological Gasification of Coals. Final Report, U.S. Department of Energy, Contract DE-AC21-87MC23285, pp. 40-63, 1990.

Basiliko, N., et al., "Influence of Ni, Co, Fe, and Na additions on methane production in Sphagnum dominated Northern American peatlands" Biogeochemistry, 2001, 52: 133-153.

Belyaev, S. S., et al. "Methanogenic Bacteria from the Bondyuzhskoe Oil Field: General Characterization and Analysis of Stable-Carbon Isotopic Fractionation" Applied and Environmental Microbiology, 1983, v. 45, No. 2, pp. 691-697.

(56) References Cited

OTHER PUBLICATIONS

Bernard, F. P., et al. "Indigenous Microorganisms in Connate Water of Many Oil Fields: A New Tool in Exploration and Production Techniques" SPE 24811, 1992, pp. 467-476.

Boone, D., et al., "Bergey's Manual of Systematic Bacteriology—Second Edition-vol. One" The Archaea and the Deeply Branching and Phototrophic Bacteria, 2001, Springer, 4 pages.

Brockman, F., "Regulation of Microbial Communities" at http://www.sysbio.org/sysbio/microbial/index.stm, 2005, 2 pages.

Brown, L., et al., "Slowing Production Decline and Extending the Economic Life of an Oil Field: New MEOR Technology", SPE 59306; SPE/DOE Improved Oil Recovery Symposium, Tulsa, Oklahoma, Apr. 3-5, 2000.

Budwill, K., "Microbial Methanogenesis and its Role in Enhancing Coalbed Methane Recovery" (Canadian Coals) CSEG Recorder (Nov. 2003) pp. 41-43.

Cervantes, F., et al., "Competition between methanogenesis and quinone respiration for ecologically important substrates in anaerobic consortia" FEMS Microbiology Ecology 34, 2000, pp. 161-171.

Claypool, G., et al., "The Origin and Distribution of Methane in Marine Sediments" Natural Gases in Marine Sediments, Ed. Isaac R. Kaplan, 1974, pp. 99-139.

Claypool, G., "Geochemical Characterization of Biogenic Gas and Coalbed Methane in Shallow Gas Fields: Eastern Denver Basin, Powder River Basin and Williston Basin" Luca Technologies, Inc. Internal Report, Jul. 8, 2001, 29 pages.

Clayton, C., et al., "Oil-Generating Coals of the San Juan Basin, New Mexico and Colorado, U.S." Org. Geochem. 1991, pp. 735-742, vol. 17, No. 6.

Clayton, C., et al., "Source Volumetrics of Biogenic Gas Generation" Bacterial Gas, Ed. R. Vially, 1992, pp. 191-204, Paris.

Coates, J., et al., "Anaerobic Hydrocarbon Degradation in Petroleum-Contaminated Harbor Sediments under Sulfate-Reducing and Artificially Imposed Conditions", Environ. Sci. Technol., vol. 30, No. 9, pp. 2784-2789, 1996.

Connan, J., et al., Anaerobic biodegradation of petroleum in reservoirs: a widespread phenomenon in nature: 18th International Meeting on Organic Geochemistry Sep. 22-26, 1997 Maastricht, The Netherlands (Abstr.), p. O2: 5-6.

Connan, J., et al., "Origin of Gases in Reservoirs" 1995 International Gas Research Conference, 1996, pp. 21-41.

Conrad, R., "Contribution of hydrogen to methane production and control of hydrogen concentrations in methanogenic soils and sediments" FEMS Microbiology Ecology, 28 (1999) pp. 193-202.

DeBruin, R., et al., "Coalbed Methane in Wyoming" Wyoming State Geological Survey (Laramie, WY), Information Pamphlet 7 (second revision), 2004, 24 pages.

Donaldson, E., et al., "Conference Focuses on Microbial Enhancement of Oil Recovery," The Oil and Gas Journal, pp. 47-52, Dec. 20, 1982.

Donaldson, E., et al., "Microbial Enhanced Oil Recovery," Developments in Petroleum Science, 1989, v. 22, pp. 1-14, 121, 123, 149, Elsevier.

Farber, E., et al., "Distinction of Bacterial and Thermogenic Hydrocarbon Gases" Bacterial Gas, Ed. R. Vially, 1992, pp. 63-74, Paris.

Ferry, et al., "Anaerobic Degradation of Benzoate to Methane by Microbial Consortium," Arch. Microbial., 1976, 107, pp. 33-40.

Flesner, R, et al., "Pilot-scale base hydrolysis processing of HMX-based plastic-bonded explosives", 4th International Symposium on Special Topics in Chemical Propulsion: Challenges in Propellants and 100 Years After Nobel, May 27-31, 1996, pp. 213-220.

Flesner, R., et al., "Pilot-scale base hydrolysis processing of HMX-based plastic-bonded explosives", Chemical Abstracts, vol. 130, No. 5, Feb. 1, 1998, Columbus, Ohio, U.S.; Abstract No. 54464a, pp. 835.

Gaasterland, T., "Archaeal Genomics" Current Opinions in Microbiology (1999) 2:542-547.

Galagan, J., et al., "The Genome of M. *acetivorans* Reveals Extensive Metabolic and Physiological Diversity" Genome Research 12: 532-542 (2002).

Gribic-Galic, D., et al., "Transformation of Toluene and Benzene by mixed methanogenic cultures," Applied and Environmental Microbiology, 1987, v. 53, pp. 254-260.

Groudeva, V., et al., "Enhanced Oil Recovery by Stimulating the Activity of the Indigenous Microflora of Oil Reservoirs": Biohydrometallurgical Technologies (Eds. Torma, A. E., Apel, M.L.; and Brierlay, C.L.): Minerals, Metals, & Mater. Soc. Biohydromet. Technol. Int. Symp, 1993 (Jackson Hole, Wy. 93.8.22-25) Proc., v. 2, pp. 349-356.

Gullapalli, I., et al., "Laboratory Design and Field Implementation of Microbial Profile Modification Process", SPE Reservoir Evaluation & Engineering, v. 3, No. 1, pp. 42-49, Feb. 2000.

Halbouty, M., "East Texas Field—USA, East Texas Basin, Texas; in Stratigraphic Traps II" (compiled by N.H. Foster, and E.A. Beaumont) AAPG Treatise of Petroleum Geology, Atlas of Oil and Gas Fields, 1991, pp. 189-206.

Hales, B., et al., "Isolation and Identification of Methanogen-specific DNA from Blanket Bog Peat by PCR Amplification and Sequence Analysis", Applied and Environmental Microbiology, 1996, pp. 668-675.

Hattori, S., et al., "Thermacetogenium phaeum gen.nov.,sp.nov., a strictly anaerobic, thermophilic, syntrophic acetate-oxidizing bacterium", Internation. Journal of Systematic and Evolutionary Microbiology (2000), 50, 1601-1609, 9 pages, 2000.

Hermann, M., et al., "Anaerobic Microflora of Oil Reservoirs: Microbiological Characterization of Samples from Some Production Wells" Bacterial Gas (R. Vially Ed.) Editions Technip. Paris, 1992, pp. 223-233.

Hunkeler, et al., "Petroleum Hydrocarbon Mineralization in Anaerobic Laboratory Aquifer Columns," Journal of Contaminant Hydrology 32, pp. 41-61, 1998.

International Search Report and Written Opinion for PCT Application No. PCT/US05/15188, mailed Nov. 15, 2005, 2 pages.

International Search Report and Written Opinion for PCT Application No. PCT/US05/15259, mailed Mar. 1, 2006, 3 pages.

International Search Report and Written Opinion for PCT Application No. PCT/US07/02420, mailed Jan. 4, 2008, 4 pages.

Ivanov, M., et al., "Additional Oil Production During Field Trials in Russia: Microbial Enhancement of Oil Recovery—Recent Advances" (4th US DOE MEOR Int Conf (Upton, NY, 1992) Proc; Elsevier Develop Petrol Sci Ser No. 39), 1993, pp. 373-381.

Ivanov, M., et al., "Die mikrobiologische Bildung von Methan in einer abzubauenden Erdollagerstatte" Frieberger Forschungshefte Reihe C, v., 1982, vol. 389, pp. 189-199.

Johnson, et al., "Preliminary Results of a Coalbed Methane Assessment of the Wind River Indian Reservation, Wyoming" Coalbed Methane, 1991, pp. 273-284.

Johnson, R., et al., "A Preliminary Evaluation of Coalbed Methane Resources of the Wind River Indian Reservation, Wyoming" Coal-Bed Methane Potential of the Wind River Indian Reservation, Ed. Stephen Manydeeds, Dec. 1991, pp. 40-64, Bureau of Indian Affairs Division of Energy and Mineral Resources.

Kasting, J., "When Methane Made Climate," Scientific American, Jul. 2004, pp. 80-85.

Kim, A., "Experimental Studies on the Origin and Accumulation of Coalbed Gas," U.S. Dept. of the Interior Bureau of Mines, Report of Investigations 8317, 1978, 18 pages.

Kim, A., et al., "Hydrocarbon Gases Produced in a Simulated Swamp Environment," U.S. Dept. of the Interior Bureau of Mines, Report of Investigations 7690, 1972, 13 pages.

Klein, A., et al., "Comparative Analysis of Genes Encoding Methyl Coenzyme M Reductase in Methanogenic Bacteria," Mol Gen Genet, 1988, 213:409-420.

Krumholtz, L, et al., "Confined subsurface microbial communities in Cretaceous Rock" Nature (Mar. 6, 1997), pp. 64-66.

Kunzig, R., "20,000 Microbes Under the Sea," Mar. 2004, pp. 32-41 , vol. 25, No. 3.

Law, B., et al., "Coalbed Gas Accumulations in the Paleocene Fort Union Formation, Powder River Basin, Wyoming" Coalbed Methane—1991; Rocky Mountain Association of Geologists, pp. 179-190.

Le Blanc, L., "Artificial Recharge," Offshore, p. 10, Feb. 2000.

(56) References Cited

OTHER PUBLICATIONS

L'Harridon, S., et al., "Hot Subterranean Biosphere in a Continental Oil Reservoir", Nature, v. 377, pp. 223-224, Sep. 21, 1995.
Li, M., et al., "Advances in Simulated Test of Biogas," Oil & Gas Geology, 1996, v. vol. 17, No. 2, pp. 117-122, with abstract.
Lollar, B., et al., "Evidence for bacterially generated hydrocarbon gas in Canadian Shield and Fennoscandian Shield rocks," Geochemicaet Cosmochimica Acta vol. 57, pp. 5073-5085 (1993).
Lomans, B., et al., "Isolation and Characterization of *Mehanomethylovorans hollandica* gen. nov., sp. nov., Isolated from Freshwater Sediment, a Methyltrophic Methanogen Able to Grow on Dimethyl Sulfide and Methanethiol," Applied and Env. Microbiology, Aug. 1999, p. 3641-3650, vol. 65.
Lovely, D., "Deep Subsurface Microbial Processes," Reviews of Geophysics, 33, 3, Aug. 1995, pp. 365-381.
Lovley, D., et al., "Use of Dissolved H2 Concentrations to Determine Distribution of Microbially Catalyzed Redox Reactions in Anoxic Groundwater," ES&T Research, Eviron. Sci. Technol., vol. 28, No. 7, 1994, pp. 1205-1210.
Luca Technologies, "Tatums—Laboratory Testing," received by the European Patent Office May 14, 2010, 2 pages.
Magot, M., et al., "Microbiology of Petroleum Reservoirs," Antonie van Leeuwenhoek, 2000, 77: 103-116.
Mattavelli, L., et al., "Deep Isotopic Light Methane in Northern Italy," Bacterial Gas, Ed. R. Vially, 1992, pp. 121-132.
McDonald, I., et al., "Molecular Ecological Analysis of Methanogens and Methanotrophs in Blanket Bog Peat," Microbial Ecology (1999) 38:225-233.
Nandi, R., et al., "Microbial Production of Hydrogen: An Overview," Critical Reviews in Microbiology, 24 (1): 61-84 (1998).
Nazina, T., et al., "Occurrence and Geochemical Activity of Microorganisms in High-Temperature, Water-Flooded Oil Fields of Kazakhstan and Western Siberia" Geomicrobiology Journal, 1995, v. 13, pp. 181-192.
Nazina, T., et al., "Microbial Oil Transformation Processes Accompanied by Methane and Hydrogen-Sulfide Formation," Geomicrobiology Journal, 1985, vol. 4, No. 2, pp. 103-130.
Neue, H., "Methane Emission from Rice Fields," BioScience, 1993, pp. 466-473, vol. 43, No. 7, downloaded from http://www.ciesin.org/docs/004-032/004-032.html.
Ng, T., et al., "Possible Nonanthropogenic Origin of Two Methanogenic Isolates from Oil-Producing Wells in the San Miguelito Field, Ventura County, California," Geomicrobiology Journal, 1989, v. 7, pp. 185-192.
O'Carroll, C., "The Pervasive Presence of Microbes," http://www/umassmag.com/Summer_2003/The_pervasive_presence_of_microbes_5_08.html, 2003, 3 pages.
Orphan, et al., "Culture-Dependant and Culture-Independent Characterization of Microbial Assemblages Associated with High-Temperature Petroleum Reservoirs," American Society for Microbiology, pp. 700-711, 2000.
Panow, A., et al., "Mechanisms of Biologically-Mediated Methane Evolution from Black Coal", Fuel Processing Technology v. 52, pp. 115-125, 1997.
PCT International Search Report and Written Opinion mailed Nov. 5, 2010; International Application No. PCT/US2010/049845; 14 pages.
Pedersen, K., "Exploration of Deep Intraterrestrial Microbial Life: Current Perspectives," FEMS Microbiology Letters 185 (2000) pp. 9-16.
Puri, et al., "Enhanced Coalbed Methane Recovery" Proceedings 1990 SPE Annual Technical Conference and Exhibition Reservoir Engineering, Sep. 23-26, 1990, New Orleans, Louisiana, SPE 20732, 1990, pp. 193-202.
Reeve J., "Archaebacteria Then . . . Archaes Now (Are There Really No Archaeal Pathogens?)" Journal of Bacteriology, vol. 181, No. 12, Jun. 1999 pp. 3613-3617.
Revesz, K., et al., "Methane production and consumption monitored by stable H and C isotope ratios at a crude oil spill site, Bemidji, Minnesota" Applied Geochemistry, 1995, vol. 10, pp. 505-515.
Rice, D., "Controls, habitat, and resource potential of ancient bacterial gas", Bacterial Gas, Ed. Vially, R., 1992, pp. 91-118, Paris.
Rice, D., et al., "Characterization of coal-derived hydrocarbons and source-rock potential of coal beds, San Juan Basin, New Mexico and Colorado, U.S.A." International Journal of Coal. Geology, 1989, pp. 597-626, vol. 13.
Rice, D., et al., "Composition and Origins of Coalbed Gas" Hydrocarbons from Coal: American Association of Petroleum Geologists Studies in Geology #38, Eds. Law, B.E., and Rice, D.D., 1993, pp. 159-184.
Rice, D., et al., "Generation, Accumulation, and Resource Potential of Biogenic Gas" The American Association of Petroleum Geologist Bulletin, vol. 65, No. 1, Jan. 1981.
Rice, D., et al., "Identification and Significance of Coal-Bed Gas, San Juan Basin, Northwestern New Mexico and Southwestern Colorado" Geology and Coal-Bed Methane Resources of the Northern San Juan Basin, Colorado and New Mexico, Ed. J. Fassett, Coal-Bed Methane, San Juan Basin, 1988, pp. 51-59, Rocky Mountain Association of Geologists.
Rice, D., et al., "Nonassociated Gas Potential of San Juan Basin Considerable" Oil & Gas Journal, Aug. 1990, pp. 60-61, vol. 88, No. 33.
Ridgley, J., et al., "Re-Evaluation of the Shallow Biogenic Gas Accumulation, Northern Great Plains, USA—Is the Similar Gas Accumulation in Southeastern Alberta and Southwestern Saskatchewan a Good Analog?" Summary of Investigations (1999) vol. 1 pp. 64-78.
Rightmire, C., et al., "Coalbed Methane Resource", 1984, Coalbed methane resources of the United States, AAPG Studies in Geology #17, Tulsa, p. 1-B.
Rooney-Varga, J., et al., "Microbial Communities Associated with Anaerobic Benzene Degradation in a Petroleum-Contaminated Aquifer", Applied and Environmental Microbiology, v. 65, No. 7, pp. 3056-3063, Jul. 1999.
Rozanova, E., et al., "Distribution of Sulfate-Reducing Bacteria Utilizing Lactate and Fatty Acids in Anaerobic Ecotopes of Flooded Petroleum Reservoirs" Institute of Microbiology, Academy of Sciences of the USSR, Moscow. Translated from Mikrobiologiya, vol. 60, No. 2, pp. 360-367, Mar.-Apr. 1991.
Rozanova, E., et al., "Microbiological Processes in a High-Temperature Oil Field", Microbiology, v. 70, No. 1, pp. 102-110, 2000.
Schoell, M., "Genetic Characteristics of Natural Gases" The American Association of Petroleum Geologists Bulletin, Dec. 1983, p. 2225-2238, vol. 67, No. 12.
Schoell, M., et al., "Natural Sites of Bio-Conversion of CO2 and Hydrocarbons in the Subsurface: San Juan Basin and Michigan Basin" 2001 AAPG Annual Convention, Jun. 3-6, 2001, p. A180, abstract only.
Scott, A.R., Intergas'95, "Limitations and Benefits of Microbiallly Enhanced Coalbed Methane," May 15-19, 1995—The University of Alabama Tuscaloosa, 10 pages, 1995.
Scott, A., "Composition and Origin of Coalbed Gases from Selected Basins in the United States" Proceedings of the 1993 International Coalbed Methane Symposium, University of Alabama/Tuscaloosa, May 17-21, 1993; pp. 207-222.
Scott, A., "Improving Coal Gas Recovery with Microbially Enhanced Coalbed Methane" in Coalbed Methane: Scientific, Environmental and Economic Evaluation; Eds. M. Mastaletcz, M. Glikson, and S. Golding, 1999, pp. 89-110, Kluwer Academic Publishers, Netherlands.
Scott, A., "Review of Key Hydrogeological Factors Affecting Coalbed Methane Producibility and Resource Assessment" Oklahoma Coalbed-Methane Workshop, 1999, pp. 12-36.
Scott, A., et al., "A New Energy Resource: Microbially Enhanced Gas Generation," 2001 AAPG Annual Convention, Jun. 3-6, 2001, p. A182, abstract only.
Scott, A., et al., "Composition, distribution, and origin of Fruitland Formation and Pictured Cliffs Sandstone gases, San Juan basin, Colorado and New Mexico", in S.D. Schwochow, D.K. Murray, and M.F. Fahy, eds., Coalbed methane of western North America: Denver, Rocky Mountain Association of Geologists, 1991, p. 93-108.
Scott, A., et al., "Limitations and Benefits of Microbially Enhanced Coalbed Methane," International Unconventional Gas Symposium (INTERGAS), May 15-19, 1995; pp. 423-432.

(56) References Cited

OTHER PUBLICATIONS

Scott, A., et al., "Microbially Enhanced Coalbed Methane: Limitations and Possible Benefits," AAPG Convention, 1995, p. 86A, abstract only.

Scott, A., et al., "Relation between basin hydrology and Fruitland gas composition, San Juan Basin, Colorado and New Mexico" Methane From Coal Seams Technology, Nov. 1991, pp. 10-18, vol. 9, No. 1.

Scott, A., et al., "Thermogenic and Secondary Biogenic Gases, San Juan Basin, Colorado and New Mexico—Implications for Coalbed Gas Producibility" AAPG Bulletin, Aug. 1994, v. 78, No. 8, pp. 1186-1209.

Smith, J., et al., "Microbial Origin of Australian Coalbed Methane" AAPG Bulletin, vol. 80, No. 6 (Jun. 1996), pp. 891-897.

Smith, J., et al., "The Stable Isotope Geochemistry of Australian Coals" Org. Geochem. vol. 3, 1982, pp. 111-131.

Springer, E., et al., "Partial Gene Sequences for the A Subunit of Methyl-Coenzyme M Reductase (Mcrl) as a Phylogenetic Tool for the Family Methanosarcinaceae", International Journal of Systematic Bacteriology, 1995, pp. 554-559.

Takashima, M., et al., "Mineral Requirements for Methane Fermentation" Critical Review in Environmental Control, vol. 19, Issue 5 (1990) pp. 465-479.

Ulrich, G., et al., "Active Biogenesis", *Energy*, Spring 2005, XP008128250, pp. 21-26.

Volkwein, J., et al., "Biological Production of Methane from Bituminous Coal", Fuel Processing Technology, v. 40, pp. 339-345, 1994.

Weiner, J., et al., "Rapid Benzene Degradation in Methanogenic Sediments from a Petroleum-Contaminated Aquifer," Appl. Environ. Microbiology 1998, vol. 64, No. 5, pp. 1937-1939.

Wellsbury, P., et al., "Deep Marine biosphere fuelled by increasing organic matter availability during burial and heating" Nature 388, 573-576 (Aug. 7, 1997).

Whitfield, J., "Origins of life: Born in a watery commune" Nature, (Feb. 19, 2004) pp. 674-676, vol. 427.

Whiticar, M., "Correlation of natural gases with their sources" In: Magoon L. and W. Dow (eds.) The Petroleum System From Source to Trap, AAPG Spec. Publ. Memoir 60, 1994, Ch. 16, 261-83.

Whiticar, M., et al., "Biogenic methane formation in marine and freshwater environments: CO2 reduction vs. acetate fermentation—Isotope evidence" Geochimica et Cosmochimica Acta, 1986, pp. 693-709, vol. 50, No. 5.

Zengler, et al., "Methane Formation From Long-Chain Alkanes by Anaerobic Microorganisms," Nature, vol. 401, pp. 266-269, Sep. 16, 1999.

Zobell, C., "Bacterial Release of Oil From Sedimentary Materials," The Oil & Gas Journal, pp. 62-65, Aug. 2, 1947.

European Examination Report of EP 05 745 350.8 mailed Mar. 14, 2011, 8 pages.

\* cited by examiner

METHODS OF STIMULATING ACETOCLASTIC METHANOGENESIS IN SUBTERRANEAN DEPOSITS OF CARBONACEOUS MATERIAL

BACKGROUND OF THE INVENTION

Natural gas is increasingly favored as an energy source over oil and coal because of its lower carbon emissions per unit of energy. Natural gas also emits significantly less nitrogen, sulfur, and heavy metals, among other pollutants, making it one of the cleanest burning hydrocarbon energy sources available on a commercial scale.

Most natural gas, including methane, is created by either thermogenic or biogenic geologic processes. Thermogenic generation involves the conversion of deep organic sediment material by extreme pressure and heat into coal, oil, and natural gas. Thermogenic generation of natural gas typically involves processes that occur on geologic timescales of thousands to millions of years. Thus like thermogenically formed coal and oil, thermogenically formed natural gas is extracted and utilized at much fast rates than it is created, disqualifying it as a renewable or sustainable energy source.

In contrast, biogenic generation of natural gas involves the activity of microorganisms metabolizing carbonaceous materials such as oil and coal into methane and other small molecule metabolic products on much shorter timescales. These microorganisms generally live amongst the carbonaceous material in environments with low concentrations of free molecular oxygen (i.e., anaerobic environments) and use metabolic pathways other than traditional aerobic respiration to live and grow. These pathways may include the breakup of the starting carbonaceous material into smaller hydrocarbon compounds, for example the fragmentation of smaller aromatic and/or aliphatic organic compounds (e.g., hydrocarbons) from a polymeric coal molecule. In an anaerobic formation environment, the pathways may further include the metabolism of the smaller organic compounds into the feedstocks of methanogenic activity. For example, the compounds may be converted by anaerobic fermentation into carbon dioxide ($CO_2$), molecular hydrogen ($H_2$), and acetate ($CH_3COO^-$) among other products. Finally, these metabolic products may be reduced by methanogenic microorganisms present in the formation to methane and other products by various methanogenic pathways.

While biogenic methane production in anaerobic formation environments has been known for some time, its contribution to commercial scale methane production has not been well understood. Unlike surface microorganisms that are readily studied in ambient air, most methanogens do not survive long in an aerobic environment. Great care must be taken to maintain these methanogens in an anaerobic environment, which makes it more difficult to extract and study them in a laboratory setting. Consequently, our understanding of the conditions that stimulate methanogen growth and activity is less developed than for many types of aerobic microorganisms.

Biogenic methane production may also be curtailed by conventional processes for recovering hydrocarbons from subsurface formation environments. For example, conventional processes for extracting natural gas from subterranean coal formations often remove a significant portion of the water from a coal seam to reduce pressure and allow previously adsorbed natural gas to flow up a well bore for recovery at the surface. As a result, the natural and ongoing biogenic production of methane can be interrupted, slowing or even halting biological methanogenesis while leaving a large mass of unutilized carbonaceous material remaining in the formation.

There is a need to, better understand how conditions in the anaerobic formation environment affect the growth and activity of methanogenic microorganisms. There is a further need to apply this understanding to the development of hydrocarbon recovery, processes that stimulate the generation and recovery of biogenic natural gas on a commercially significant scale. These and other topics are addressed in the present application.

BRIEF SUMMARY OF THE INVENTION

Methods are described for stimulating an acetoclastic methanogen pathway and/or population in microorganism consortia to increase and sustain biogenic natural gas production from those consortia. The acetoclastic pathway is one of two significant pathways for the production of methane that metabolizes acetate ($CH_3COO^-$) into methane and carbon dioxide:

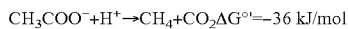
$$CH_3COO^- + H^+ \rightarrow CH_4 + CO_2 \; \Delta G^{\circ\prime} = -36 \text{ kJ/mol}$$

The other pathway involves the metabolism of molecular hydrogen and carbon dioxide into methane and water, and is commonly referred to as the $H_2/CO_2$ or "hydrogenotrophic" pathway:

$$4H_2 + CO_2 \rightarrow CH_4 + 2H_2O \; \Delta G^{\circ\prime} = -131 \text{ kJ/mol}$$

Many genera of methanogens have shown exclusive use of the hydrogenotrophic pathway for methane production, while a smaller set of methanogens, including the *Methanosarcina*, have shown the ability to use both the acetoclastic and hydrogenotrophic pathways, among others.

The larger number of methanogens that are believed to rely exclusively on the hydrogenotrophic pathway, as well as the more favorable thermodynamics have led researchers to speculate that this is the dominant methanogenesis pathway in native microorganism consortia living in anaerobic formation environments. However, more recent studies by Luca Technologies have indicated that the acetoclastic pathway can be activated, in certain native and/or transplanted consortia to create an increased rate of in-situ methane production that is sustainable for up to several years. Additionally, the studies have indicated ways of increasing the number of microorganisms preferentially or exclusively using the acetoclastic pathway that increases the rate of in situ methane production.

These studies include field tests where acetate compounds and other facilitators of the acetoclastic methanogenesis pathway are supplied to a subterranean coalbed and afterward observing changes in methane production. The studies indicated that the acetate amendments were followed by increases in methane production that so far exceeded the amount of acetate added as to rule out a simple stiochiometric conversion of the acetate to methane. Moreover, the increased methane production rates were maintained for much longer than expected periods (in some instances on the order of 2-5 years) for a single acetate amendment injection to the formation environment. The field studies led to the conclusion that acetate was acting as more than a mere nutrient for methanogens in the microorganism consortium, and behaved more like an activator that could permanently (or long term) alter the methanogenic activity in the consortium. Additional details about acetate amendment processes to stimulate biogenic natural gas production may be found in co-assigned U.S. Pat. No. 7,696,132 to Pfeiffer et al, the entire contents of which is herein incorporated by reference for all purposes.

The field tests and additional laboratory work have led to the development of processes that stimulate in-situ acetoclastic methanogenesis to increase the production of natural gas from a subterranean geologic formation. These processes are complementary to processes for growing the overall population of microorganism consortium in the formation. They may also be complementary to processes that increase hydrogenotrophic methanogenesis pathways. Thus, in some instances the processes stimulate dormant acetoclastic methanogens which then add methane production from acetate to the already active hydrogenotrophic methanogens in the consortium. In other instances, the processes stimulate at least a portion of the microorganisms using the hydrogenotrophic pathway over to the acetoclastic pathway, i.e., *Methanosarcina*, to create a consortium capable of higher rates of methane production for longer periods of time. In still other instances, the processes may stimulate both the activation of a dormant acetoclastic methanogens and the stimulation of some portion of the hydrogenotrophic methanogens to acetoclastic methanogens, i.e. *Methanosarcina*.

Embodiments of the invention include methods of stimulating acetoclastic methanogenesis in a subterranean geologic formation containing carbonaceous material. The methods may include the steps of accessing a microorganism consortium in the subterranean geologic formation, and assessing the microorganism consortium for acetoclastic methanogenic activity. An amendment may be provided to increase methane production in the microorganism consortium from acetoclastic methanogenic pathways relative to hydrogenotrophic methanogenic pathways.

Embodiments of the invention further include methods to increase an amount of methane produced by acetoclastic methanogenesis in a subterranean geologic formation environment containing carbonaceous material. The methods may include accessing the carbonaceous material in the subterranean geologic formation, and providing microorganisms to the carbonaceous material in the formation. The microorganisms may use one or more acetoclastic methanogenic pathways. The methods may further include assessing the geologic formation environment for acetoclastic methanogenic activity.

Embodiments of the invention may still further include methods to increase a rate of acetoclastic methanogenesis in a subterranean geologic formation environment containing carbonaceous material. The methods may include accessing a microorganism consortium in the subterranean geologic formation, and assessing the microorganism consortium for acetoclastic methanogenic activity. The methods may further include modifying the geologic formation environment based on the assessment of the microorganism consortium to increase methane production in the microorganism consortium from acetoclastic methanogenic pathways relative to hydrogenotropic methanogenic pathways.

An alternative design of the invention may utilize the disclosed processes in an ex situ environment that may include a bioreactor or digester. The process may involve the extraction of formation water that may or may not have been previously analyzed. Upon extraction, the formation water may be incorporated into a bioreactor or digester to convert a carbonaceous material into methane that may be collected for use. Amendments may also be added that increase methane production from acetoclastic methanogenic pathways relative to hydrogenotropic methanogenic pathways.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Methods are described for stimulating acetoclastic methanogenic pathways in microorganisms to increase biogenic natural gas production from subterranean geologic formations containing carbonaceous material. In some instances the geologic formations may be developed coal beds, coal mines, oil fields, shale, and oil shale that have been previously developed with conventional hydrocarbon recovery techniques. From the point of view of biogenic natural gas production, these formations have exhibited an early peak in hydrocarbon recovery rates using the traditional recovery techniques, and may have entered a period of significant decline in terms of output. The present techniques slow, and often reverse, this output decline to restore the formation to a commercially viable natural gas producer for a significant period beyond what is commercially practical with conventional hydrocarbon recovery techniques (e.g., several years or longer).

Acetate is a main precursor of methane creation during anaerobic digestion of organic matter, and there are distinct mechanisms for methane creation from acetate, including acetoclastic and hydrogenotrophic. Acetoclastic methanogenesis includes a one-step conversion of the methyl group of acetate to methane and release of the carboxyl group as carbon dioxide with the reaction being performed by Methanosarcinaceae or Methanosataceae. This mechanism may be thermodynamically favored by high acetate concentrations or the presence of inhibitory levels of ammonia. The hydrogenotrophic mechanism includes a two-step reaction sequence that begins with the anaerobic oxidation of acetate, splitting it into hydrogen (H2) and two carbon dioxide (2-CO2) molecules. This reaction may occur in a syntrophic association between an acetate oxidizing bacteria such as *Clostridium* spp. that splits the acetate, and a hydrogenotrophic methanogen, such as *Methanobacteriales* or *Methanomicrobiales*, which converts the hydrogen and carbon dioxide into two molecules of methane. This syntrophic acetate oxidation may be optimal at temperatures between 35° C. to 65° C., and maintains very low acetate concentrations within the system.

Figure 1:
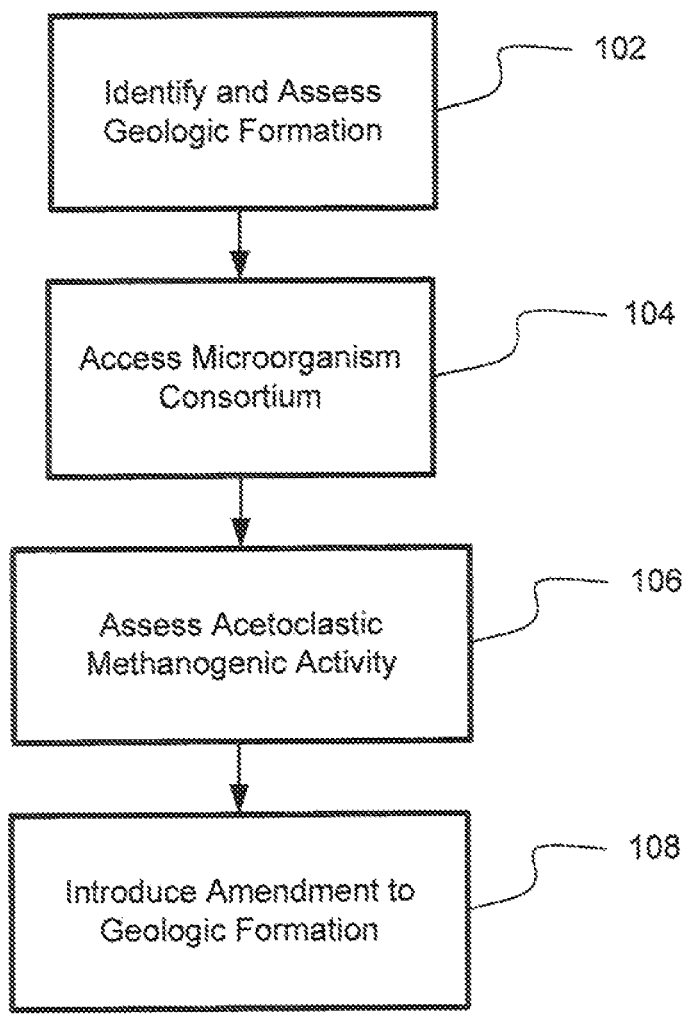
FIG. 1 is a flowchart showing selected steps in a method of stimulating acetoclastic methanogenesis in a subterranean geologic formation containing carbonaceous material that includes providing an amendment to the formation.

FIG. 1 is a flowchart showing selected steps in a method 100 of stimulating acetoclastic methanogenesis in a subterranean geologic formation containing carbonaceous material. The method 100 may include an assessment of the formation 102 to determine if the native conditions are suitable for the stimulation of acetoclastic methanogenesis. As noted above, the identification of the formation may be based on previously worked formations, such as mature oil fields, coal beds, and natural gas producing wells, among other formation sites. Alternatively, the identified formation may not have been previously worked.

The assessment of the identified formation may include field measurements of the formation environment including, temperature, pH, and salinity of the formation water in the formation environment. The assessment may also include extracting gases, liquids and/or solid samples from the formation for laboratory analysis.

For example, the formation samples may be analyzed with a variety of chemical instrumentation such as spectroscopy, NMR, HPLC, gas chromatography, mass spectrometry, and/or voltammetry, among other instrumentation and techniques. The analysis may measure a variety of sample characteristics, including the relative concentration of elements like carbon, phosphorous, nitrogen, sulfur, magnesium, sodium, potassium, manganese, iron, calcium, zinc, tungsten, cobalt, and molybdenum, among others. The analysis may also be used to measure the quantities of polyatomic ions such as $PO_2^{3-}$, $PO_3^{3-}$, $PO_4^{3-}$, $NH_4^+$, $NO_2^-$, $NO_3^-$, $SO_4^{2-}$, and $CH_3COO^-$, among others. The quantities of vitamins and other nutrients may also be determined. For formation water samples, determinations of pH, salinity or conductivity, dissolved oxygen concentration, oxidation-reduction potential (Eh), and other solution, characteristics may also be performed.

The analysis of the formation samples may further include a biological analysis of the microorganisms present (if any) in the formation environment. The analysis may include quantitative measurements of the population size as determined by direct cell counting techniques such as microscopy, flow cytometry, DNA quantification, phospholipid fatty acid analysis, quantitative PCR, and/or protein analysis, among others. The taxonomic identification of one or more members of the microorganism consortium by genetic analysis may also be conducted. For example, an analysis of the DNA of microorganisms may be done where the DNA is optionally cloned into a vector and suitable host cell to amplify the amount of DNA to facilitate detection. In some embodiments, the detecting is of all or part of ribosomal DNA (rDNA) of one or more microorganisms. Alternatively, all or part of another DNA sequence unique to a microorganism may be detected. Non-limiting examples of nucleic acid detection techniques include restriction fragment length polymorphism (RFLP) or terminal restriction length fragment polymorphism (TR-FLP); polymerase chain reaction (PCR); DNA-DNA hybridization, such as with a probe, Southern analysis, or the use of an array, microchip, bead based array, or the like; denaturing gradient gel electrophoresis (DGGE); or DNA sequencing, including sequencing of cDNA prepared from RNA; among other non-limiting examples.

The method may further include accessing a microorganism consortium in the subterranean geologic formation 104. In instances where the formation has been previously worked using conventional hydrocarbon recovery processes, access to the microorganisms may be gained by previously drilled well bores and other access points. Alternatively (or in addition) a new opening may be formed in the formation by digging, drilling, etc., through a surface layer to access the underlying site where the microorganisms are located.

Once access to the microorganism consortium in the subterranean formation is established, the consortium may be assessed for acetoclastic methanogenic activity 106. The assessments may include in-situ assessments of the formation environment, including an analysis of the gaseous and liquid environments where the microorganisms are located. For example, formation waters may be tested for the ability of indigenous microorganisms present in the water to convert acetate to methane, and the rate at which this reaction occurs.

Acetoclastic methanogenesis may be inferred by analyzing the stable isotope composition of the newly created methane gas. In general, methane created through acetoclastic methanogenesis may be less depleted in naturally occurring carbon-13 than methane created through hydrogenotrophic methanogenesis. The opposite isotope bias may occur for the hydrogen content in methane; there may be significantly less "heavy hydrogen," or Deuterium, in methane created through acetoclastic methanogenesis than in methane created through hydrogenotrophic methanogenesis. These differences allow for the systematic classification of methane as created through hydrogenotrophic or acetoclastic methanogenesis.

Figure 4:
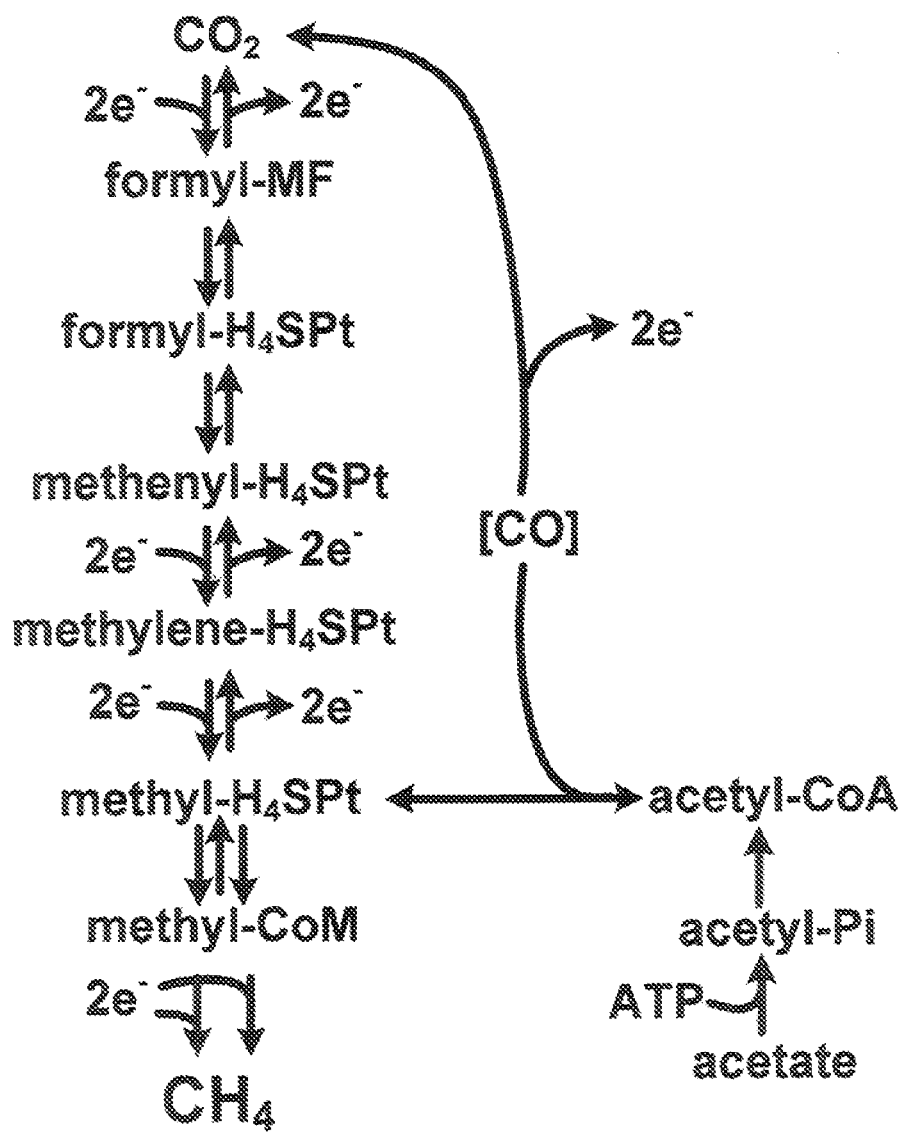
FIG. 4 shows some exemplary anaerobic methanogenesis pathways.

The assessments may further include the identification of metabolic intermediates that are indicative of activity for a methanogenic pathway, and more specifically an acetoclastic methanogenic pathway. For example, both the hydrogenotrophic and acetoclastic pathways end with the reduction of a methyl group covalently attached with coenzyme-M to methane (see the methanogenic metabolic pathways shown in FIG. 4). Thus, the detection of coenzyme-M (CoM) in the formation environment is evidence of methanogenic activity. Acetoclastic pathways also generally split the starting acetate molecule into a methyl group ($CH_3$—), which forms the methyl-CoM complex that is reduced to methane, and a carboxyl ion that is oxidized to $CO_2$ and may be processed through the hydrogentrophic methanogenesis pathway ($CO_2+H_2$) to form another methane. Determining that the methyl group in methyl-CoM originated from acetate may be evidence of acetoclastic methanogenesis Further evidence of activity in an acetoclastic methanogenesis pathway may come from the identification of one or more enzymes associated with these pathways. For example, the identification and measurement of acetate kinase (AckA) and/or phosphoacetyl transferase (Pta) to convert acetate ions into an acetyl-CoA complex may be used to measure acetoclastic methanogenesis. The identification and measurement of acetyl-CoA synthetase may be used to measure acetoclastic methanogenesis. Additional details about metabolic pathways for methanogenesis are described in co-assigned U.S. patent application Ser. No. 12/187,724 to Havermen et al, titled "Analysis and Enhancement of Metabolic Pathways for Methanogenesis," the entire contents of which is herein incorporated by reference for all purposes.

The assessments of acetoclastic methanogenic activity may also include an analysis of the microorganisms found in the consortium. These analyses may include obtaining nucleic acid sequencing information from the genetic material extracted from the microorganisms. For example, DNA sequencing analyses of 16S rRNA genes and/or mcrA genes, encoding a subunit for the methyl-CoM reductase, extracted from the microorganisms may be performed and compared with the sequences of known methanogens. The obtained sequence information may be compared to known methanogens, including methanogens that are known to utilize an acetoclastic methanogenic pathways, such as methanogens of the genera *Methanosarcina* (e.g., *Methanosarcina acetivorans*) and *Methanosaeta* (e.g., *Methanosaeta concilii*). The presence of these methanogen genera in the microorganism consortium is indicative of at least the capability of acetoclastic methanogensis in the microorganism consortium.

After assessing the microorganism consortium for acetoclastic methanogenic activity, an amendment may be introduced to increase methane production in the microorganism consortium from acetoclastic methanogenic pathways 108. In some instances, the amendment may include a supply of an activator compound that acts similar to a catalyst in that a small amount of the activator is needed to stimulate acetoclastic activity over a large population of the microorganisms for long periods of time. One class of these activator compounds are acetate compounds that may eventually be consumed by the acetoclastic methanogens, but that increase the amount of biogenic methane produced in amounts much greater than expected for a simple stiochiometric conversion of acetate to methane. Examples of acetate compounds that may act as activators include acetic acid, salts of acetic acid (e.g., alkali metal salts such as sodium acetate and potassium acetate, alkali earth metals salts, etc.), among other acetate compounds. These acetate compounds may be added as aqueous solutions to the formation water in the formation to increase the in-situ acetate concentration by about 1 mM or more, about 5 mM or more, about 10 mM or more, about 15 mM or more, etc. The acetate compound may also be added to the formation water in the formation to maintain an acetate concentration (e.g., about 1 mM, 2 mM, 5 mM, 10 mM, etc.) for a period of time (e.g., about 60 days or more, 90 days or more, etc.).

In addition to (or in lieu of) an acetate compound, other amendments may be added to the formation environment. These amendments may include phosphorous-containing compounds, carboxylate compounds other than acetate compounds (e.g., benzoate compounds, formate compounds, etc.), molecular hydrogen and hydrogen release compounds, and yeast extract, among other compounds. They may also include vitamins, minerals, and metals.

The amendment may selectively increase the methane produced by acetoclastic methanogenic pathways relative to hydrogenotrophic methanogenic pathways in the microorganism consortium. When first accessed, for example, the microorganism consortium may be dominated by microorganisms that rely exclusively on hydrogenotrophic methanogenesis pathways. Examples of these types of methanogens include *Methanobacteriales*, *Methanococcales*, *Methanomicrobales*, *Methanopyrales*, and *Methanocellales*, among other orders of hydrogenotrophic methanogens. The microorganism consortium may also include methanogens of the order *Methanosarcinales* that are capable of using the acetoclastic methanogenesis pathway, but their relative populations are significantly smaller because conditions favor the hydrogenotrophic methanogenesis pathway. The amendment may stimulate *Methanosaeta* and/or stimulate *Methanosarcina* to rely more on the acetoclastic pathway, and may also increase their population growth in the formation as a result of the increased metabolic activity that is not shared by exclusively hydrogenotrophic microorganisms. Over time, the amendment may shift the microorganism consortium from dominantly hydrogenotrophic to dominantly acetoclastic.

Figure 2:
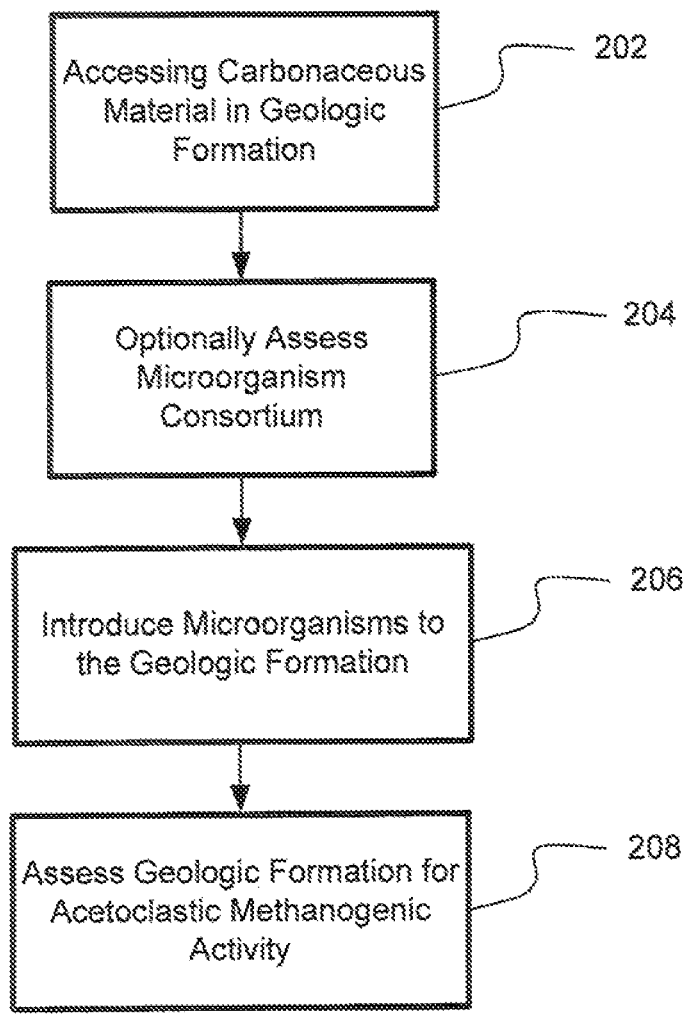
FIG. 2 is a flowchart showing selected steps in a method to increase the amount of methane produced by acetoclastic methanogenesis in a subterranean geologic formation that includes providing microorganisms to the formation.

In some instances, the assessment of the microorganism consortium may reveal that the numbers of acetoclastic capable microorganisms in the population is at or near zero. In these instances (among others), acetoclastic methanogenic activity may be increased by providing acetoclastic microorganisms to the formation, either with or without an accompanying amendment. FIG. 2 shows selected steps in a method 200 to increase the amount of methane produced by acetoclastic methanogenesis in a subterranean geologic formation environment by providing such microorganisms. The method 200 may include accessing the carbonaceous material in the subterranean geologic formation 202. When accessing the carbonaceous material also provides access to a microorganism consortium in the formation, the method may also optionally assess the consortium for population measurements of methanogens 204, including acetoclastic methanogens.

When the carbonaceous material is accessed, microorganisms may be introduced to the formation that are capable of using acetoclastic methanogenesis pathways 206. Exemplary microorganisms may include *Methanosarcina* and/or *Methanosaeta*, among other genera of microorganisms capable of acetoclastic methanogenesis. The microorganisms may be provided from outside the formation, or from a different part of the same formation. Microorganisms provided from outside the formation may be, for example, laboratory cultivated microorganisms and/or field cultivated microorganisms recovered from one or more other formations where acetoclastic methanogenesis is occurring. Microorganisms may also be transferred from outside the formation, or from a different location within the same formation without any culturing or enrichment.

When the microorganisms are recovered from another formation, they may be collected and concentrated from the water extracted from the formation. The anaerobic state of the extracted formation water may be maintained during the various steps of the extraction, such as pumping, filtration, storage and delivery to the target formation environment. To prevent excessive oxygen contamination from the air, the formation water may be maintained in a closed system that is flushed with non-oxygen gases such as nitrogen, argon, and/or helium, among others, or amended with oxygen scrubbing chemicals such as sodium sulfide, among other reductants. Low pressure pumps, such as vein, fin, and/or rotary pumps using needle, ball and/or butterfly valves, may be used to draw out the microorganisms containing formation water from the formation. Additional details on the extraction, concentration and delivery of anaerobic microorganisms from between formations (or from one part of a formation to another) are described in co-assigned U.S. Pat. No. 7,640,978 to Pfeiffer et al, the contents of which are herein incorporated by reference for all purposes.

Following activation of the microbial community and growth of the acetoclastic capable microorganisms, the formation environment may be assessed for acetoclastic methanogenic activity 208. The assessment of this activity may include monitoring the rates of natural gas emissions from the formation, and noting any changes in production rates. Assessments may further include in-situ assessments of the formation environment, identification of metabolic intermediates, and/or analysis of the microorganism consortium as noted above.

Figure 3:
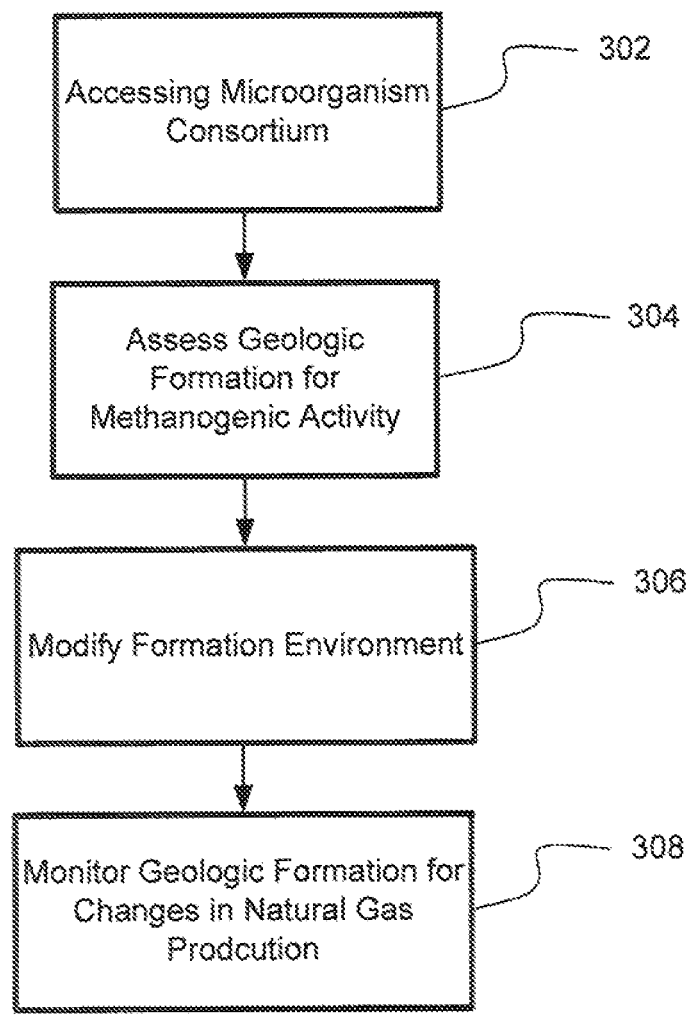
FIG. 3 is a flowchart showing selected steps in a method of increasing acetoclastic methanogenesis in a subterranean geologic formation environment containing carbonaceous material that includes modifying the geologic formation environment.

In addition to introducing chemical amendments and/or microorganisms to the formation environment, additional modifications may be performed to increase the rate of acetoclastic methanogenesis. FIG. 3 shows selected steps in a method 300 of increasing acetoclastic methanogenesis in a subterranean geologic formation environment containing carbonaceous material that includes modifying the geologic formation environment. The method 300 may include accessing the carbonaceous material in the formation, and may further include accessing a microorganism consortium in the subterranean geologic formation 302. The formation may then be assessed generally, as well as specifically assessed for acetoclastic methanogenic activity 304.

General assessments may include, for example, elemental species determinations (e.g., concentration measurements for carbon, phosphorous, nitrogen, sulfur, magnesium, manganese, iron, calcium, zinc, etc.); polyatomic species composition determinations (e.g., concentration measurements for phosphates, phosphites, sulfates, sulfites, nitrates, nitrites, ammonium, hydrogen sulfides, bisulfides, sulfides, etc.); carbonaceous materials determinations; acidity/alkalinity (pH) determinations; salinity determinations including conductivity, total dissolved solids, cations, or anions; oxidation-reduction potential (Eh) determinations; temperature determinations; permeability, natural and induced hydraulic gradients, water flow and transport determinations; formation solids density and porosity determinations; among other assessments of the subterranean formation environment.

Specific assessments of acetoclastic methanogenic activity may include identification of metabolic intermediates and products indicative of acetoclastic methanogenesis, as well as the measurement of nutrients and activators that stimulate acetoclastic methanogenesis. The assessments may also include the identification and population measurements of microorganism genera that are capable of using acetoclastic methanogenic pathways.

A modification to the formation environment may be done based on the assessment of the formation environment 306. These modifications may include adding solutions to the formation environment to change one or more of the environmental characteristics in the formation water, carbonaceous material, and/or microorganism consortium in the formation environment. For example, the water may dilute or disperse compounds and microorganisms over a larger volume of the formation to make additional growth stimulants available to the microorganisms (e.g., activators, nutrients, etc.) while possibly also removing waste compounds and other growth inhibitors. The water may also be treated by the removal of compounds and/or the addition of compounds. For example, acids, bases and/or buffers may be added to change the pH in a treated portion of the formation environment. Activators and/or nutrients may be added to stimulate the growth of acetoclastic methanogens and/or increase the use of acetoclastic methanogenic pathways in the native consortium.

The solutions may consist primarily of water from a source outside the formation (e.g., a different formation, a treated water supply, etc.) and/or water transported from a different part of the same formation that otherwise would not flow freely to the treatment site. The solutions may be introduced through a "push-pull" delivery mode where formation water is first withdrawn from the formation environment before the solution is introduced into the formation with or without nutrient amendments, then withdrawn again. In one embodiment of this technique, the formation environment may be accessed by multiple wells, with some wells drawing out formation water while one or more of other wells are introducing the solution to the formation. The introduced solution may reach the carbonaceous material and/or microorganisms by gravity feed and/or with the application of a hire induced gradient through increased pumping rates and pressure.

The modification of the formation environment may be followed by monitoring the formation for changes in the rate of natural gas production 308. In some embodiments, the formation environment is monitored for a predetermined period of time (e.g., about one week, about one month, about two, three, four, five, six months, etc.) before at least a portion of the formation water is withdrawn and the natural gas recovered for commercial use. In additional embodiments the withdrawn water may be treated (e.g., filtered of methanogenesis inhibitors and/or supplemented with methanogenesis activators, nutrients and other methanogenesis promoters) and reintroduced to the subterranean geologic formation. In some embodiments, the withdrawal, treatment, and reintroduction of the formation water may be done on a continuous (or near continuous) basis to create a water circulation pathway within the subterranean formation.

The formation environment modification should, among other outcomes, have the effect of eventually increasing the rate of acetoclastic methanogenesis in the formation. Where a methanogenic microorganism consortium is already present, the modification may shift the methanogenic pathways from predominantly hydrogenotrophic to predominantly acetoclastic. This may occur through a shift in the favored methanogenic pathway of the existing microorganisms and/or a shift in the relative microorganism populations from predominantly hydrogenotrophic methanogens to acetoclastic capable methanogens.

An alternative design of the invention utilizes the disclosed processes in an ex situ environment that can include a bioreactor or digester. Subsequent to accessing a subterranean geologic formation, formation water may be assessed for acetoclastic methanogenic activity. The assessment may be performed within the formation environment, or after the formation water has been extracted from the subterranean environment. The extraction may be performed under anaerobic conditions utilizing equipment that maintains the formation water under substantially anaerobic conditions at all times.

In one example, an ex situ digester may be prepared with a carbonaceous material. The digester may be purged or otherwise have the oxygen content removed in order to provide an anaerobic environment prior to or subsequent to the incorporation of the carbonaceous material. The vessel may include a flexible top piece which provides additional volumetric capacity for expansion of the generated vapors. The formation water having an assessed acetoclastic methanogenic activity may also be incorporated into the digester once anaerobic conditions have been obtained within the digester. The digester may be operated in various, scenarios to include high or low solids content, at optimized solids and hydraulic retention times; i.e. SRT and HRT respectively, and may include between about 5% and 75% solids content. Alternatively, the solids content may be between about 10% and 50%, about 20% and 40%, less than about 25%, less than about 20%, less than about 15%, less than about 10%, etc., or less. The solids content may additionally be changed during the operation of the digester based on the makeup of consortium and carbonaceous material during digestion.

Figure 7:
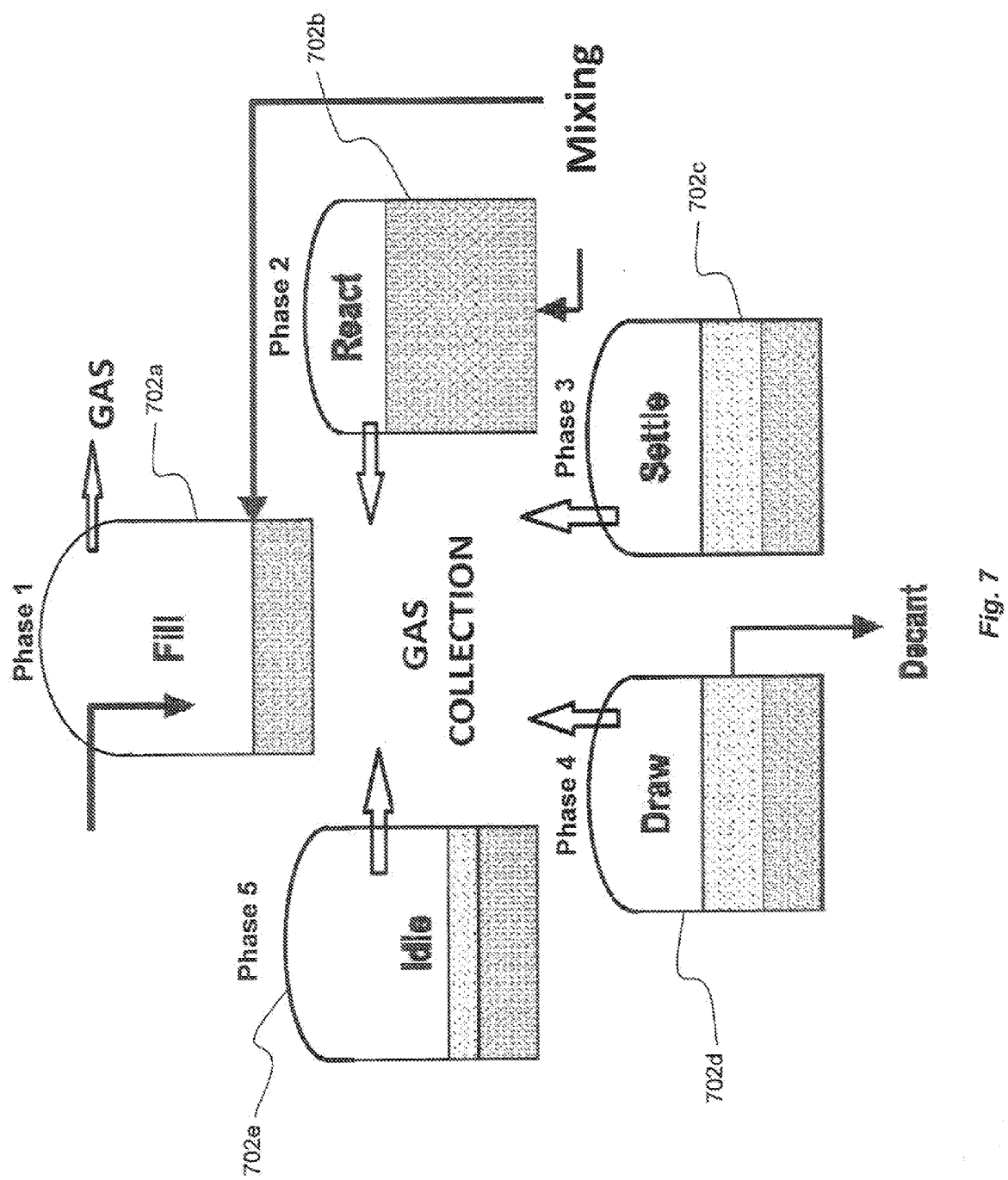
FIG. 7 illustrates an exemplary anaerobic/slurry phase-sequencing batch reactor (A/SP-SBR) according to embodiments of the present technology.

The digester may be operated in a batch or sequential mode, and may contain 1, 2, 3, 4, 5, 6, etc., or more tanks that are fluidly coupled with each other and with piping and pumping equipment. An exemplary digester configuration is shown in FIG. 7, where a single vessel 702 is shown during four stages of reactor performance followed by an idle period. Exemplary Sequencing Batch Reactor processes may include 4 reactor vessels each of which is in a different phase of the process at any point in time. The individual reactors may or may not be fluidly coupled for transfer of fluids or mixtures between vessels. The Idle stage of the process cycle listed as Phase 5 may be engineered into the process as a time event within the 4 reactor system, or alternatively incorporated as a separate fifth cycle. During the fill stage depicted in 702a, a fluid mixture containing formation water and carbonaceous material is deposited in the reactor vessel. The vessel may contain a sludge or residue blanket of material from previous processing already. The vessel may or may not be mixed throughout or at some period during the fill process. Additional materials including amendments, nutrients, and activation agents may be provided during the fill stage, as well as later during the react stage, if necessary. During the fill, as well as all subsequent steps, produced methane may be released and collected through piping, or other transfer equipment coupled with the digester. The react stage shown in 702b involves further agitation through mixing or other processes to allow methanogenesis, including acetoclastic methanogenesis to occur. During the reaction, the microorganisms metabolize the carbonaceous material producing methane as a byproduct of the digestion.

During the settle stage illustrated in vessel 702c, the mixing or other agitation processes are stopped, and the resultant sludge is allowed to settle from the treated supernatant. The sludge may contain active as well as inactive or dead microorganisms, wastes, and carbonaceous material that has not been digested during the reaction process. After adequate settling has occurred, the draw process as shown in 702d is performed in which at least a portion of the treated fluid above the sludge is removed through decanting or other outflow processes that may not disturb the settled sludge. Sludge material may optionally be removed during this period as well. Directly after the draw process shown in 702d a subsequent fill process may be performed. Alternatively, an idle stage as depicted in vessel 702e may be performed in which further settling, or removal of sludge may be performed. Gas collection may also continue through this and all other processes prior to an additional fill process.

The temperature at which the digester operates may be set based on the composition of the microbial consortia in the digester. Depending on the microbial makeup, the temperature of the digester may be set at a temperature, or allowed to fluctuate within a range of from about 10° C. or less up to about 70° C. or more. Alternative digester designs may maintain the temperature between about 20° C. to about 50° C., about 30° C. to about 40° C., about 50° C. to about 60° C., etc. After incorporation of the formation water and carbonaceous material, agitation or periodic removal of material may be performed to increase the methane generation by providing more surface area for use by the microorganisms.

Additional material may be provided into the digester as amendments to facilitate breakdown of the carbonaceous material by the microorganisms. The material may include nutrients, activation agents, or other materials as described above for changing the environmental parameters within the digester. Exemplary amendment materials may include amendments that increase methane production in the microorganism consortium from acetoclastic methanogenic pathways relative to hydrogenotrophic methanogenic pathways. Various amendments are described previously that may be used. The digester may also be seeded prior to full use to allow the desired microorganism consortium to acclimate and flourish as required.

The carbonaceous material may be provided into the digester in stages, or as a single batch. The digester may then be operated in various reactor configurations to allow the microorganisms to convert the carbonaceous material into methane and other consumption products. The digester may be operated to allow or to force movement of the material from one tank to another in a multi-tank design, and any of the tanks may include agitation mechanisms including those found in stirred-tank or internal circulation reactors. An exemplary digester may include an up-flow sludge blanket where carbonaceous material and formation water is fed into the digester from below a generated sludge blanket suspended in the liquid within the vessel. The sludge blanket may include the microorganism consortium which breaks down the carbonaceous material as it passes through the blanket. This process may allow enhanced solid retention time for larger carbonaceous materials, while providing mechanisms for recycling and wasting material from the digester. Additionally, expanded granular sludge bed concepts may be incorporated that increase upward flow velocity of the carbonaceous material. This design may provide an expansion of the sludge blanket allowing for more contact between the carbonaceous material and microorganisms.

The digester may be operated in a plug-flow configuration, which may decompose a fraction of the carbonaceous material during the residence time. In alternative designs, the formation water may have residence times in terms or hours or days, and the carbonaceous solids may have residence times for days, weeks, or months depending on the particle size, and degree of decomposition sought. Any amount of recycling may be used to enhance residence times within the reactor or through the reactor, such as with a recycled flow of the formation water. After suitable residence time that may be monitored via methane generation levels, additional batch processes may be performed, or adjustments may be made to the materials within the digester. In one example, the methane generation is monitored as it is collected from the digester. Based on fluctuations in the volumetric production of methane, decisions may be made for increasing or decreasing the amount of carbonaceous material in the digester, adjusting environmental parameters within the vessel, and adding amendments for use by the consortium. Each of these decisions may affect the production of methane within the digester, as well as the speed or extent of degradation of the carbonaceous material by the microorganisms.

In one example, the volume of methane produced from the vessel as compared to the amount of carbonaceous material being used may indicate that the consortium may be activated to increase decomposition speed. An amendment that may include an acetate compound may be administered to the microorganisms to boost the rate at which they decompose the carbonaceous material. Faster decomposition may provide an increase in methane production from the vessel. Additionally, the new operational design may decrease waste particle size, and allow more complete use of the carbonaceous material as well as more efficient conversion of the material into methane.

It should be appreciated that the methods of enhancing acetoclastic methanogenesis described above can all be performed on the same subterranean formation sequentially or simultaneously. For example, the initial assessment of the formation may include assessments of the chemical and physical characteristics of the formation environment as well as an identification of the genera and relative population percentages of a microorganism consortium found in the formation. The assessments may also include measurements of acetoclastic methanogenic activity in the formation. After an analysis of the assessment data, an action plan may be developed that includes the sequential or simultaneous addition of a chemical amendment package, the introduction of acetoclastic capable microorganisms, and modifications to the formation environment by, for example, the circulation of water through the formation environment and/or the introduction of surfactants to increase the mobility of nutrients and other methanogen stimulants to the microorganisms. Some specific examples of the methods will now be described.

EXPERIMENTAL

Figure 5A:
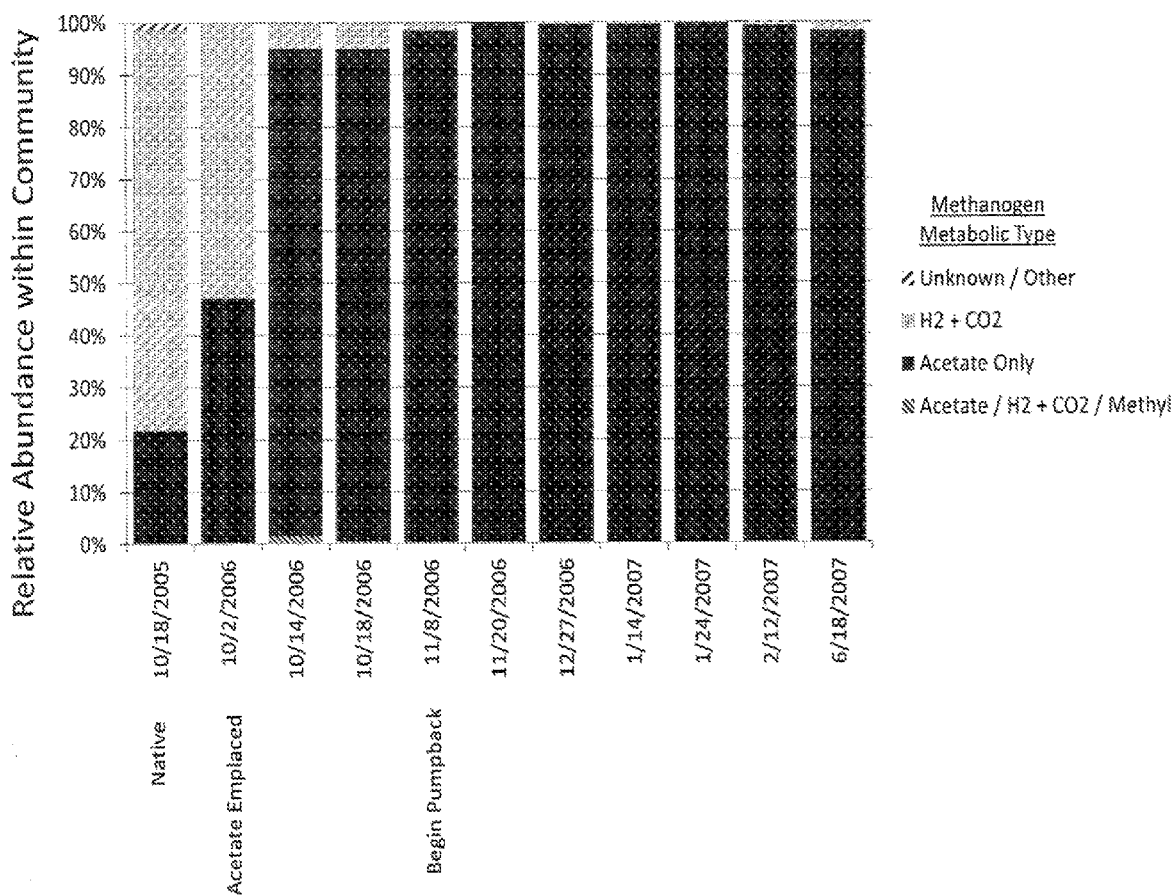
FIG. 5a is a bar chart showing the relative abundance of microorganism types from archaeal and bacterial microorganism samples extracted from a field well before and after the well is treated with an acetoclastic simulating amendment.
Figure 5B:
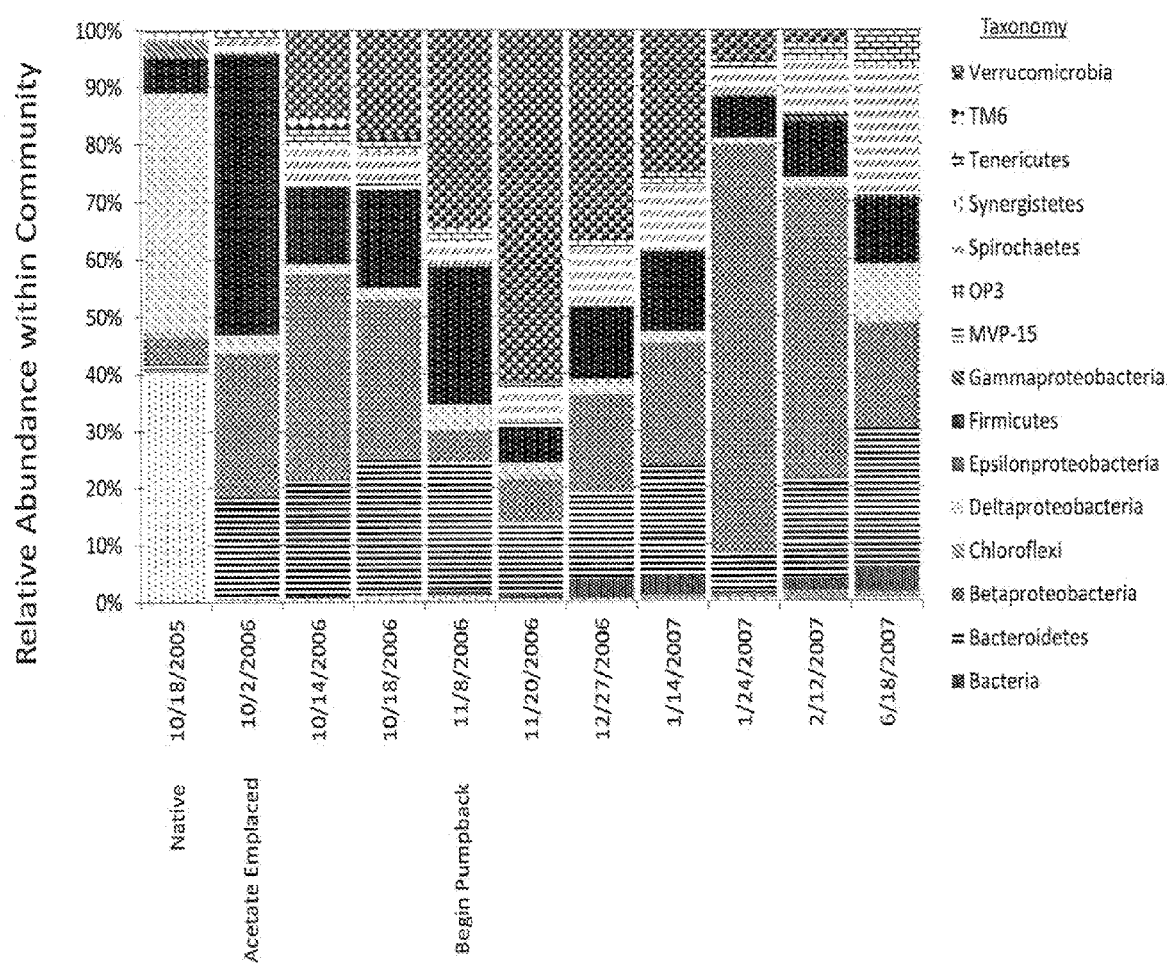
FIG. 5b is another bar chart showing the relative abundance of microorganism types from archaeal and bacterial microorganism samples extracted from a field well before and after the well is treated with an acetoclastic simulating amendment.

Field tests were conducted on a mature coal-bed methane natural gas well in the Powder River Basin region in Wyoming. FIGS. 5a-b show the relative abundance of microorganism types from archaeal, FIG. 5a, and bacterial, FIG. 5b, microorganism samples extracted from the well both before and after the well was treated with an amendment that includes an acetate activation compound. Total injection volume was 975,450 gallons of formation water, as well as 575.7 lbs. of sodium acetate trihydrate and 2404.7 lbs. of anhydrous sodium acetate. The effective average concentration of acetate in the injection water was 4.06 mM. In the pretreatment period, well 23M-2283 was used to access a microorganism consortium in the subterranean formation and obtain samples for microorganism population analysis. The pretreatment analysis showed the archaea in the microorganism consortium was dominated by hydrogenotrophic methanogens (~80% of the archaeal population), while acetoclastic methangens were in a clear minority (~20% of the archaeal population).

After the acetate amendment was introduced to the in-situ microorganism consortium the total microbial population density increased from $4.2 \times 10^4$ cells/ml to $1.5 \times 10^6$ cells/ml, and the relative populations of hydrogenotrophic to acetoclastic methanogens began to shift to favor the acetoclastic population. The shift can be seen in FIG. 5a comparing the sections for metabolic type based on H2+CO2 to the metabolic type based on acetate only. After a two week period following the introduction of the amendment, new microorganism population measurements showed a dramatic population shift with the acetoclastic methanogens now representing greater than 90% of the total archaea, and the hydrogenotrophic methanogens representing less than 10%. When natural gas recovery operations started following the two-week period, microorganism population sampling continued to show the dominance of the acetoclastic methanogens, which at some points represented almost 100% of the total archaea population. FIG. 5b shows sample measurements taken of the bacterial phyla and/or class in the microorganism population both before and after the acetate amendment. Shifts in the relative bacterial population were observed, but without a specific phyla and/or class remaining dominant as a result of the amendment.

Figure 6:
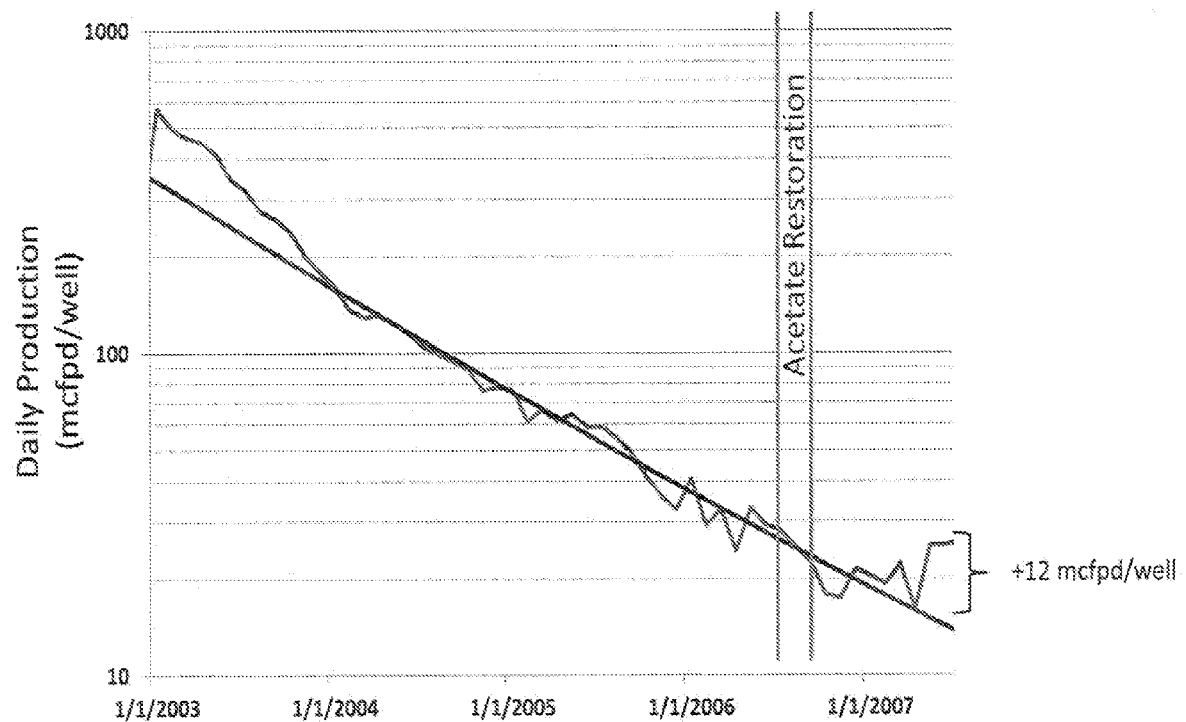
FIG. 6 is a plot of the average natural gas production from a 4 well test area before and after a treatment to stimulate methanogenesis.

FIG. 6 shows how the introduction of the acetate amendment and the increase in the relative population of the acetoclastic methanogens correlates with an increase in the natural gas production from a treated well, and three offset wells in communication with the treated well, in the Powder River Basin field test. In this test, the average daily rate of natural gas production (measured in thousands of cubic feet of natural gas produced per day (mcfpd)) was measured for 3 wells that are offset from the restoration well 23M-2283 that received only the acetate activation amendment in the test area. Historical data reaching back 5 years prior to when the well was treated with the amendment show an exponential decline in the wells' production rate after about 2.5 years of conventional natural gas recovery operations. By the end of the fifth year, the average production rate had dropped to about 7% of the peak average recovery rates, and the wells were considered close to the end of their commercial production life.

At the end of year five, the acetate amendment was introduced, and as is apparent from the gas production data plot for well 23M-2283 in FIG. 6 that this affected a reversal of the decline in natural gas recovery from the well. An integration of the production data was performed to calculate the increase in actual post-treatment recovery rates compared to the extrapolated rates predicted if no treatment was done. This analysis shows that this treatment provided an additional 700 thousand cubic feet (MCF) of recovered natural gas during the post restoration period from operation of these three offset wells.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the compound" includes reference to one or more compounds and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:
1. A method of stimulating acetoclastic methanogenesis in a subterranean geologic formation containing carbonaceous material, the method comprising:
    accessing a microorganism consortium in the subterranean geologic formation;
    assessing the microorganism consortium for acetoclastic methanogenic activity; and providing an amendment to increase methane production in the microorganism consortium from acetoclastic methanogenic pathways relative to hydrogenotrophic methanogenic pathways.

2. The method of claim 1, wherein the assessing of the microorganism consortium for acetoclastic methanogenic activity comprises measuring rates of methane production from the acetoclastic methanogenic pathways relative to the hydrogenotrophic methanogenic pathways.

3. The method of claim 1, wherein the assessing of the microorganism consortium for acetoclastic methanogenic activity comprises identifying one or more acetoclastic microorganisms.

4. The method of claim 3, wherein the acetoclastic microorganism comprises a *Methanosarcinales* microorganism such as *Methanosaeta* spp. and/or *Methanosarcina* spp.

5. The method of claim 1, wherein the amendment provided to increase methane production in the microorganism consortium from acetoclastic methanogenic pathways comprises an acetate compound.

6. The method of claim 1, wherein the acetate compound comprises at least one of acetic acid, an alkali metal salt of acetic acid, or an alkali-earth metal salt of acetic acid.

7. The method of claim 1, wherein the amendment provided to increase methane production in the microorganism consortium from acetoclastic methanogenic pathways comprises at least one of vitamins or minerals.

8. The method of claim 1, wherein the amendment increases a total biomass of the microorganism consortium.

9. A method to increase a rate of acetoclastic methanogenesis in a subterranean geologic formation environment containing carbonaceous material, the method comprising:

accessing a microorganism consortium in the subterranean geologic formation;

assessing the microorganism consortium for acetoclastic methanogenic activity; and modifying the geologic formation environment based on the assessment of the microorganism consortium to increase methane production in the microorganism consortium from acetoclastic methanogenic pathways relative to hydrogenotrophic methanogenic pathways.

10. The method of claim 9, wherein the modifying of the geologic formation environment comprises introducing an amendment to the formation environment that increases the methane production in the microorganism consortium from the acetoclastic methanogenic pathways.

11. The method of claim 9, wherein the modifying of the geologic formation environment comprises introducing acetoclastic microorganisms to the formation environment that were not previously present in the formation.

12. The method of claim 11, wherein the acetoclastic microorganisms comprise *Methanosarcinales* microorganisms.

13. The method of claim 9, wherein the modifying of the geologic formation environment comprises introducing water into the geologic formation.

14. The method of claim 9, wherein the modifying of the geologic formation environment comprises circulating formation water from a first part of the geologic formation to a second part of the geologic formation.

* * * * *